United States Patent [19]

Shimizu

[11] Patent Number: 4,640,259

[45] Date of Patent: Feb. 3, 1987

[54] DEVICE FOR FEEDING WORK TO MACHINE TOOL

[75] Inventor: Hiroshi Shimizu, Tokyo, Japan

[73] Assignee: Yasunaga Engineering Kabushiki Kaisha, Ueno, Japan

[21] Appl. No.: 720,238

[22] Filed: Apr. 5, 1985

[30] Foreign Application Priority Data

Jan. 21, 1985 [JP] Japan ................................. 60-7568

[51] Int. Cl.⁴ .............................................. B28D 1/06
[52] U.S. Cl. .................................. 125/16 R; 125/21; 51/165.9
[58] Field of Search ................ 51/76 R, 165.9; 125/16 R, 21, 12, 13

[56] References Cited

U.S. PATENT DOCUMENTS

| 1,927,750 | 9/1933 | Mennesson | 125/11 CD |
| 1,950,030 | 3/1934 | Hawes | 51/76 R |
| 3,435,815 | 4/1969 | Forcier | 125/16 R |
| 3,525,324 | 8/1970 | Bonnefoy | 125/21 |

FOREIGN PATENT DOCUMENTS 58-2794  1/1983  Japan ................................. 125/21

Primary Examiner—Harold D. Whitehead
Attorney, Agent, or Firm—Jordan and Hamburg

[57] ABSTRACT

Device for feeding work (U) to machine tool comprising a work table and an air float (14) in a water vessel (15) and connected with said table by a rod (12) so that said work is pushed up against the tool (WL) as working proceeds. In one embodiment, a manometer (19) for detecting air pressure in said buoy is so arranged that when detected air pressure is deviated from preset value, a signal generated therefrom may control pump-valve means (23, 24) for supplying water into said vessel (15). In another embodiment, a second rod (33) arranged to be in parallel to said first rod (12) to be vertically moved upward in a preset rate and a load cell (39) arranged between said two rods in such a way that when electrical resistance thereof is deviated from a preset value, a signal generated therefrom may control air pressure in said air float (14).

4 Claims, 3 Drawing Figures

DEVICE FOR FEEDING WORK TO MACHINE TOOL

BACKGROUND OF THE INVENTION

The invention relates to a device for feeding a work to a tool such as cutting area of the wire saw, and more particularly to such device comprising an air float in a water vessel of which buoyancy is utilized for pushing the work to the tool as the working such as cutting proceeds with controlled pushing force.

In some machine tools such as the wire saw, not the tool but the work is fed toward the tool. When pushing the work to a wire or an array consisting of a number of parallelly arranged wires extended in tension is alternatingly moved in longitudinal direction with supplying abrasive medium, the work pushed thereagainst is cut. If a table supporting the work thereon is fed too slowly in comparison with the cutting rate, the cutting force is to be too small to attain efficient cutting. In order to attain efficient cutting with keeping fineness and accuracy of the cutting of the work, it is very important to control such feeding rate and consequently such cutting force or pushing force, in addition to other working conditions such as wire reciprocal movement speed, wire tension, amount of abrasive medium to be supplied, pace for delivering out fresh wires to relieve worn and fatiqued wires and so on.

Hitherto a hydraulic piston-cylinder device has been used for feeding the work which is fixed on the table mounted at the free end of the piston. Having set various working conditions as referred to above, the operator manually handle the device to supply oil under pressure into the cylinder to push said table and consequently the work against the wire array and controll the oil supply rate with watching cutting progress so as to attain desired feeding rate or pushing force.

The hydraulic device has inevitably seal means such as piston ring between the piston outersurface and the cylinder inner surface so that there is caused friction. Such friction often hinders smooth and stable feeding and retraction of the work which may jeopardize fineness and accuracy of the cutting or further give damages thereto.

In order to overcome the defect of the piston-cylinder feeding device, e.g. JP-B-2794/1983 proposes a device comprising a cylindrical float having an open bottom to be buoyed in a water vessel and a work table mounted on the top thereof; a cylindrical chamber having an open top and arranged stationarily in said vertically movable float; and means for controllably supplying oil under pressure into said chamber at the bottom thereof so as to control the pressure of air confined in said float depending on varied oil level in said chamber.

According to this float-type device the table and consequently the work is raised up against the wire array by manually controlling oil supply rate like as in said piston-cylinder device but smoothly and stably different therefrom. This is, however, still unsatisfactory in that the device is to be too bulky and complex as a whole and consequently expensive due to the hydraulic pressure system.

SUMMARY OF THE INVENTION

An object of the invention is, thus, to provide a float-type device for feeding the work to the tool of more compactness and simpleness, and consequently of lower cost.

Another object is to provide such device having means for detecting whether or not the pushing force is deviated from a predetermined value or a range of values to automatically control said force.

The other objects and advantages of the invention will be appreciated by studying the specification.

Such objects and advantages may be attained according to the invention by providing a device for feeding a work to a tool comprising a table for supporting said work thereon, an air float arranged in a water vessel to be buoyed therein, a rod connecting said table with said float so that said work is pushed up against the tool as working proceeds and means for controlling said float buoyance, characterized in that said air float is connected with a source of air under pressure in the one hand and atmosphere in the other hand through a conduit having a valve and that there is provided means for detecting whether or not said pushing force is suitable so as to control the force to a preset value.

More specifically, said detecting means may be a manometer detecting air pressure in said float, which is a parameter of said pushing force. When detected pressure is deviated from a preset value or value range, correspondingly generated signal controls the water level rising rate in said vessel, which varies the pushing force correspondingly.

As detecting means, also a load cell may be used which is arranged between said connecting rod and a second rod, which is arranged in parallel thereto and adapted to be vertically moved upward at a preset rate, in such a way that when said connecting rod is moved up faster or slower than said second rod as the working proceeds said load cell is subjected to strain which is a parameter of the pushing force. Correspondingly generated signal controls said air pressure.

BRIEF DESCRIPTION OF THE DRAWINGS

The invention shall be explained in more detail in reference to examples illustrated in the accompanying drawing; in which.

DESCRIPTION OF EXAMPLES

Figure 1:
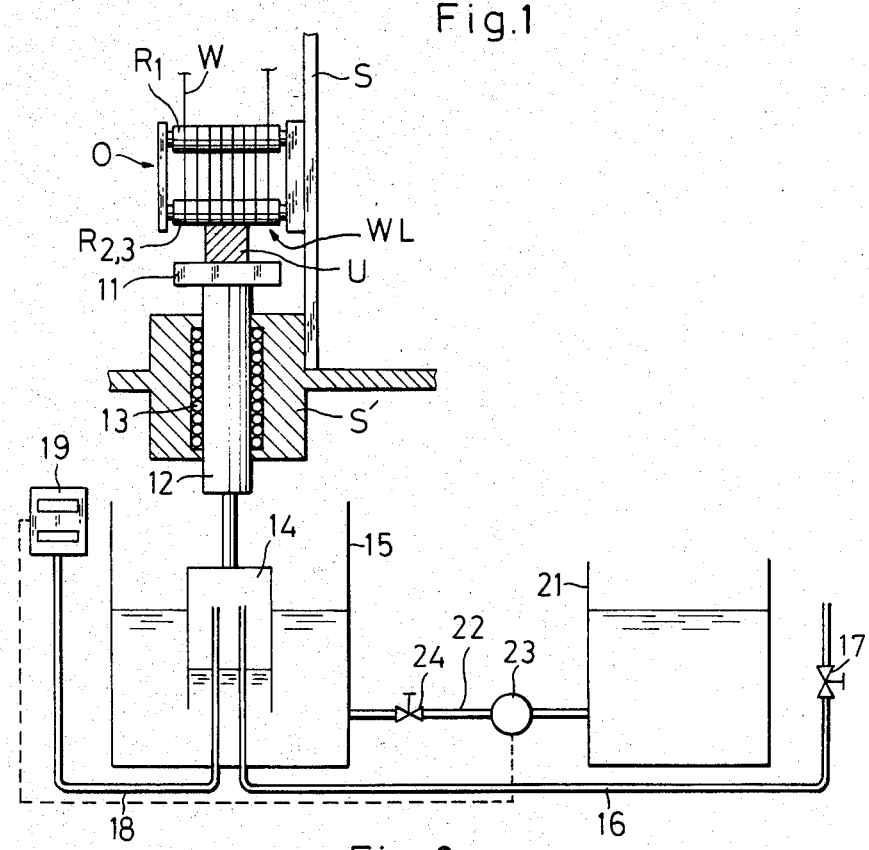
FIG. 1 is a schematic view of the device according to the invention in which the manometer is used as detecting means in conjunction with a wire saw as an example of the machine tool.
Figure 3:
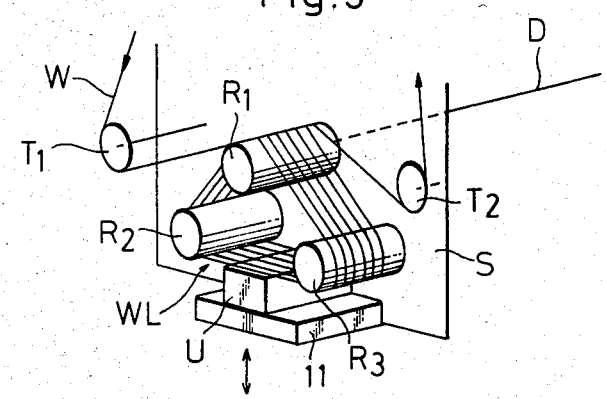

In FIG. 1, there is a part of the wire saw shown in the upper portion and mounted on a machine frame S, which shall be explained also in reference to FIG. 3. Three rollers $R_1$, $R_2$ and $R_3$ are mounted on the machine frame S for rotation. A length of wire W is extended in tension from a feeding reel (not shown) through a guide roller $T_1$ to wind around said rollers $R_1$, $R_2$ and $R_3$ several times (six times in the illustrated example) to be taken up by a reel (not shown) through another guide roller $T_2$. For instance when a shaft D of the roller $R_1$ is driven by a reversible motor (not shown), a wire array WL may alternatingly move in its extending direction. When a work U carried on a table 11 is pushed against said wire array WL, reciprocatingly moving wires cut the work U into several slices (seven slices in the illustrated example) with aid of abrasive medium.

Said table 11 is mounted on the upper end of a connecting rod 12 which is guided by a groove formed in the machine frame S' via bearings 13 such as ball bearings or cross roller bearings so that the rod 12 may smoothly and stably be raised or lowered. The lower end of the rod 12 is fixed with an air float 14 buoyed in a water vessel 15.

The air float 14 is connected through a conduit 16 having a valve 17 with a source of air under pressure (not shown) and atmosphere so that the pressure of air confined in said float may be raised or lowered by actuating said valve 17. Said float 14 is connected through a conduit 18 also with a manometer 19 so as to detect said air pressure.

A second water vessel 21 is connected through a conduit 22 having a pump 23 and a valve 24 with said first water vessel 15 so that the water level therein may be raised or lowered for raising or lowering the float 14.

When water level rising rate is in coincidence with a desired cutting rate, the air pressure detected by the manometer will be kept unchanged, but if the former is faster than the latter the stress affected on the work U by the wire array WL, or force of pushing the work U against the wire array WL is made larger and the air pressure will be increased. In this meaning, the air pressure detected by the manometer 19 is a parameter of the pushing force or cutting force.

This embodiment intends to automatically control said pushing force at a desired level by detecting said air pressure by said manometer 19 so that when detected air pressure is deviated from a preset level, an electric signal to be generated from said manometer, for instance by actuation of a limit switch (not shown) by a manometer indicator needle (not shown), drives the pump 23 or stops it so as to control water level rising rate and consequently said pushing force.

Practically preset level is not one but preferably two, namely upper and lower limits so that when the detected air pressure is higher than said preset upper limit or lower than said preset lower limit, generated electrical signal electromagnetically actuates a series of solenoid valves 24 to shut or open a circuit of water flow driven by the pump 23.

The valve 17 is manually actuated in advance so as to controll the amount of air in the buoy 14. When higher or larger pushing force is required for instance cutting the work U of a harder material or cutting a work in the form of a bar (of, for instance, silicon) into a large number of thinner wafers at the same time, the air amount should be increased.

Figure 2:
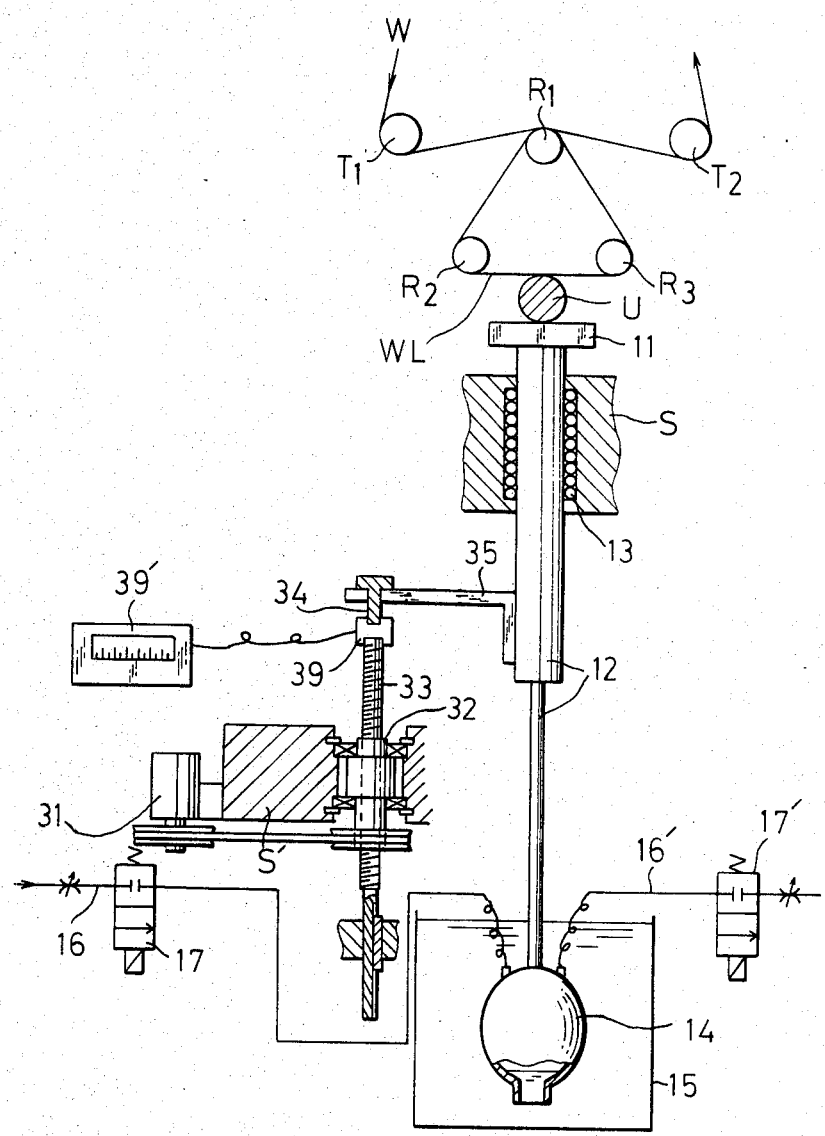
FIG. 2 is a similar view in which the load cell is used as detecting means, and FIG. 3 a perspective schematic view of the wire saw, which itself is not in the scope of the invention.

In FIG. 2, there is shown a part of the wire saw in the upper portion similar to FIG. 1 but in different direction. The work table 11 is similarly connected by the rod 12 with the air float 14 buoyed in the water vessel 15. The air float 14 is arranged below the water surface in operation so as to provide a predetermined constant buoyancy.

The air float 14 is connected through a conduit 16 having a valve 17 with a source of air under pressure (not shown) and through a conduit 16' having a valve 17' with atmosphere so as to regulate the air pressure therein.

On the machine frame S', there are provided a reversible-variable speed motor 31 and a nut 32 to be rotated thereby. Said rotatable nut 32 is threadedly engaged with a screw rod 33 to be raised and lowered. A load cell 39 as detecting means is fixedly attached on the free end of said vertically movable rod 33. The other side of the load cell 39 is fixedly attached with a headed pin 34, which is fitted in a hole formed in an L-shaped arm 35 which is fixedly attached with the connecting rod 12.

In such arrangement, when the motor 31 is driven in one direction at a constant speed, the threaded rod 33 is raised at a correspondingly constant speed. When the air pressure in the float 14 and consequently the buoyance thereof is in coincidence with the threaded rod rising speed, the assembly of the float 14, the connecting rod 12 having the bracked 35 fixed thereto and the table 11 supporting the work U is raised up as the cutting proceeds so that the headed pin 34 affects slightly pulling force on the load cell 39 and a correspondingly resulted electrical resistance is to be seen on an indicator 39'.

When the air pressure in the float 14 is too high and consequently when the rate of said assembly rising is higher than the preset speed of the rising threaded rod 33, the stress affected on the load cell is to be made larger. When the situation is reverse to the above, the threaded rod 33 rising faster than the connecting rod 12 is to push up the headed pin 34 snugly fitted in the groove formed in the bracket so that the stress on the load cell is made smaller to be in zero. Such deviation from the preset value may be converted in an electrical signal so as to electromagnetically actuate the valve 17 or 17' to lower or raise the pressure of air in the float 14.

In this embodiment, strain of the load cell 39 or electrical resistance thereof is a parameter of the pushing force. Practically it is also preferable to preset the upper and lower limits so that when detected electrical resistance is larger than said upper limit or smaller than said lower limit, correspondingly generated electrical signal may open or shut the solenoid valves 17, 17'.

What is claimed is:
1. A device for feeding a work to a tool comprising:
a machine frame;
a slidable member slidably connected to the machine frame so that the slidable member can be moved vertically, said slidable member having an upper end adapted to support the work thereon and a lower end;
means for moving the slidable member upwardly, said moving means including a container having liquid therein, an air float connected to the lower end of the slidable member, said air float being substantially completely submerged in the liquid in the container so that the slidable member can be moved upwardly by means of buoyancy of the air float, and means for controlling buoyancy of the air float so that speed of movement of the slidable member in the vertical direction can be controlled, and
means for comparing the speed of the vertical movement of the slidable member and a desired speed, said comparing means operating the controlling means to change buoyancy of the air float so that the work on the table can be moved at desired speed.

2. A device according to claim 1, in which said comparing means comprises a motor connected to the machine frame, a rod situated parallel to the slidable member and connected to the motor so that the rod can be moved upwardly along the slidable member, and a load cell situated between the rod and the slidable member, said load cell, when the slidable member is moved upwardly by means of the moving means and the motor is actuated to move the rod upwardly at desired speed, detecting difference of the speed between the slidable member and the rod, buoyancy of the air float being controlled by the load cell.

3. A device according to claim 2, in which said comparing means further comprises an L-shaped arm connected to the slidable member extending perpendicularly thereto, and a headed pin situated on the arm above the rod, said load cell being disposed between the pin and the rod so that when the slidable member is raised faster than the rod, the load cell is subjected to larger tensile stress, while when the slidable member is raised slower than the rod, the headed pin is pulled up relative to the arm to decrease tensile stress on the load cell.

4. A device according to claim 3, in which said means for controlling buoyancy of the air float comprises an air inlet conduit connected to the air float, an air outlet conduit connected to the air float, an air inlet valve situated in the air inlet conduit, and an air outlet valve situated in the air outlet conduit, said comparing means controlling the air inlet and outlet valves.

* * * * *